July 27, 1965   H. WENKING ETAL   3,196,739
DISPERSION COMPENSATED PHOTOELECTRIC POLARIMETER
Filed March 20, 1961

INVENTORS:
Hans Wenking
Johannes Flügge
BY Singer, Stern & Carlberg
Attorneys.

United States Patent Office 3,196,739
Patented July 27, 1965

3,196,739
DISPERSION COMPENSATED PHOTOELECTRIC
POLARIMETER
Hans Wenking and Johannes Flügge, Gottingen, Germany, assignors to Carl Zeiss, Oberkochen, Wurttemberg, Germany
Filed Mar. 20, 1961, Ser. No. 97,005
Claims priority, application Germany, Mar. 24, 1960,
Z 7,895
4 Claims. (Cl. 88—14)

The invention relates to improvements in photoelectric polarimeters and particularly concerns improvements in a photoelectric polarimeter as disclosed in the U.S. Patent No. 2,933,972, issued on April 26, 1960. This prior photoelectric polarimeter employs the light intensity variation principle in which the object to be measured is arranged between a stationary polarizer and an analyzer system consisting of a stationary analyzer and a Faraday coil through which passes a constant alternating current and in which a photocell is arranged rearwardly of the analyzer system, the photocell being connected with an alternating current amplifier. This polarimeter is provided with an additional Faraday coil arranged in the path of the light rays in the rear of the polarizer and serving as an automatic compensation of the rotation of the plane of polarization of the light passing through the object to be measured, and this coil is connected with a switching element which converts the alternating current supplied by the photocell into a direct current.

The amount and the plus or minus sign of the specific rotation of the object to be measured are dependent upon the wave length of the light and show a course which is termed rotation dispersion.

The Verdet's constant is defined as the angle about which the plane of polarization of plane polarized monochromatic light is rotated and being equal to a distance of one centimeter in a longitudinal magnetic field having the strength of one gauss. This material constant also is dependent upon the wave length of the light, i.e. it shows a certain dispersion. Since in general the dispersion of the specific rotation of the measured object does not conform to the dispersion of the Verdet's constant of the magneto-optical active substance of the compensation Faraday coil, the effect of a direct current of a predetermined current value flowing through this coil for the rotation of the plane of polarization of the light at different wave lengths of the measuring light is generally different.

For this reason the photoelectric polarimeter disclosed in the U.S. Patent No. 2,933,972 requires the employment of a monochromatic source of light. For the production of monochromatic light well known devices are requiresd, as for instance spectral lamps, interference filters, monochromators with accessory devices, namely devices which are costly when purchased and costly in operation. Furthermore, the restriction of the spectral band of the measuring light causes losses of useful radiant energy which in many cases prematurely limit the examination of absorbing measuring objects.

It is an object of the present invention to eliminate all these disadvantages and this is accomplished by certain improvements of the polarimeter disclosed in the aforesaid U.S. Patent No. 2,933,972. The improved polarimeter of the preesnt invention is provided with a measuring light source which supplies light of a certain range of wave length and the magneto-optical active substance for the compensation Faraday coil is so selected that the Verdet's constant shows a dispersion which conforms to the specific rotation of the object to be measured and extends over the entire range of the wave length of the source of light. There may be employed, for example, a simple incandescent lamp as a measuring light source, whereby for the selection of the useful wave length range suitable filters are employed.

The measuring light source therefore is of much simpler construction in the improved polarimeter of the present invention and is considerably less expensive than that of the polarimeter made in accordance with the U.S. Patent 2,933,972. Furthermore, the new polarimeter permits a comparatively much higher percentage of the radiant energy furnished by the measuring light source to be used for the measurement so that many light absorbing measuring objects which cannot be measured by the prior polarimeter are now accessible for an investigation by the polarimeter of the present invention.

Principally it is possible to employ also sources of light which are not monochromatic, but have a high luminous density, for instance a xenon high pressure lamp.

It is another object of the invention to employ in place of a compensation Faraday coil the Verdet's constant of which shows a dispersion conforming to the specific rotation of a single object, a compensation Faraday coil which can be adjusted to the exact conformity of dispersion. Such a compensation Faraday coil has arranged in series two or more magneto-optical active substances having different Verdet's constants, and by balancing the proportional lengths of these substances the desired total dispersion can be obtained.

It is of particular advantage to employ in a compensation Faraday coil which is adjusted to conformity in addition to one or more magneto-optical active substances a column of liquid which is continuously variable in its length. By adjusting the length of the column of liquid it is possible to obtain fine adjustments of the conformity. With such a compensation Faraday coil it is possible to bridge larger ranges of variations so that this compensation coil may be used for measuring objects having different rotation dispersions.

The mentioned adjustment to conformity is obtained by changing the proportionate lengths of the substances until at least for two wave lengths the same ratio between the Verdet's constant of the compensation Faraday coil and the specific rotative movement of the measuring object has been established. After this adjustment has been completed, the relation between the concentration of the measured substance and the electric current passing through the compensation Faraday coil is definitely determined and is practically independent of the wave length of the light.

An advantageous embodiment of a compensation Faraday coil adjustable to conformity contains a liquid filled polarimeter tube provided with a catch container and of which one end of the tube is closed by a slidable glass rod which is axially movable in said tube. The Verdet's constants of said liquid and of said glass rod cooperate proportionally according to the effective thicknesses of the layers.

It may be of advantage to employ in place of the compensation Faraday coil which is adjusted to a conformity such type of a coil which contains a plurality of magneto-optical active substances, each of which by means of a changer device may be selectively introduced into the path of the light rays. In such a case it is advisable to construct the changer device in such a manner that it is arranged completely within the compensation Faraday coil. In this manner it is possible to move for each measuring substance a predetermined and previously selected magneto-optical active substance into the path of the light rays.

With these and other objects in view the invention will now be described in greater detail with reference to the accompanying drawings, in which.

Figure 1:
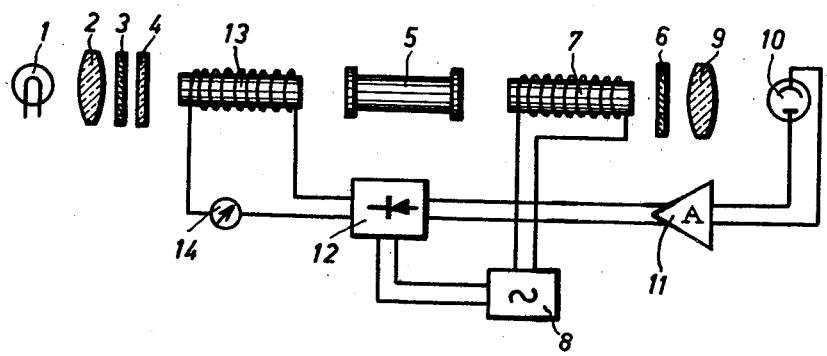
FIG. 1 illustrates diagrammatically one embodiment of a photoelectric polarimeter of the invention.

Referring to FIG. 1, the photoelectric polarimeter is provided with an incandescent lamp 1, a condenser 2 for producing a beam of light having parallel rays, a light filter 3 and a stationary polarizer 4. The measuring object 5 is arranged between the polarizer 4 and a stationary analyzer 6. In front of the analyzer 6 is placed a Faraday coil 7 which is energized by a constant alternating current supplied by the alternating current source 8. A lens 9 projects and focusses the beam of light onto the photo cathode of the photoelectric cell 10. The alternating current produced by the photoelectric cell 10 is amplified by the alternating current amplifier 11 and thereupon is phase depending rectified by the rectifier 12. The direct current produced in this manner energizes the compensation Faraday coil 13 and effects an automatic compensation of the rotation of the plane of polarization of the light passing through the measuring object 5. A measuring instrument 14 indicates the direct current energizing the Faraday coil 13.

The compensation Faraday coil 13 contains a magneto-optical active substance the Verdet's constant of which has a dispersion which conforms to the specific rotation of the measuring object 5, within the wavelength range of the light source 1, 3. If the polarimeter is to be used, for instance, to measure sucrose, then the magneto-optical active substance within the compensation Faraday coil 13 may consist of a mixture of 77.73 volume percent acetone in water. The following Table 1 shows that such a mixture is suitable for a measure since the Verdet's constant within the range of the wave length of the measuring light is 589 to 436 m$\mu$. and shows a conformal dispersion with the specific rotation of the sucrose to be measured.

*Table 1*

| $\lambda$[m$\mu$.] | 589 | 546 | 436 | Remarks |
|---|---|---|---|---|
| $|\alpha|$ [degree] | 66.45 | 78.2 | 128.5 | Sucrose. |
| $\omega$[min.] | 0.01202 | 0.01424 | 0.02336 | Acetone-water mixture. |
| $\omega$:$|\alpha|$ | 0.000181 | 0.000182 | 0.000182 | |

$\alpha$=specific rotation.   $\omega$=Verdet's constant.

If the photoelectric polarimeter of FIG. 1 is to be used for measuring glucose, the magneto-optical active substance in the compensation Faraday coil 13 may consist of water. The following Table 2 shows that this substance is suitable for measuring glucose within the wavelength range of 589 to 436 m$\mu$.

*Table 2*

| $\lambda$[m$\mu$.] | 589 | 546 | 436 | Remarks |
|---|---|---|---|---|
| $|\alpha|$ [degree] | 53.0 | 62.5 | 101.0 | Glucose. |
| $\omega$ [min.] | 0.01309 | 0.01549 | 0.02508 | Water. |
| $\omega$:$|\alpha|$ | 0.000247 | 0.000248 | 0.000248 | |

Figure 2:
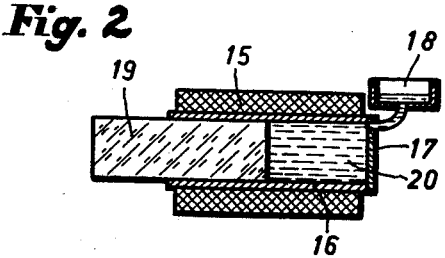
FIG. 2 is a longitudinal sectional view of a compensation Faraday coil adjusted to a conformity.

The compensation Faraday coil shown in FIG. 2 consists of the basic field coil 15 into which a polarimeter tube 16 is slidably inserted. One end of the tube 16 is closed by a cover glass 17 which is provided with an aperture connected with a catch container 18. Into the other, left hand, end of the tube 16 is slidably adjustably inserted a quartz glass rod 19. The cavity formed within the tube 16—between the rod 19 and the cover glass 17—is filled with a liquid 20 which latter, when the rod 19 is pushed into the tube 16, is forced in part into the container 18.

The Verdet's constants of the liquid 20 and the rod 19 operate together proportionally corresponding to the active thicknesses of the layers. If, for instance, a quartz glass rod of 100 millimeters length is pushed into the polarimeter tube 16, the Verdet's constant of the quartz glass rod of 100 millimeter length and the Verdet's constant of the liquid adjusted to a corresponding predetermined layer thickness act together.

It is assumed in the following Table 3 that the liquid 20 consists of carbon disulphide and the rod 19 of quartz glass. In this Table 3 the thickness of the layer of carbon disulphide is indicated as a fraction $p$ of the length $l$ of the quartz glass rod, namely for the thickness 0 of the layer of carbon disulphide up to the carbon disulphide layer thickness .7 times the length of the quartz glass rod. The quartz glass rod length $l$ consists of the length of the rod 19 plus the thickness of the cover glass plate 17. The Verdet's constants $\omega$ for the wavelengths 436 m$\mu$. and 546 m$\mu$. are given in the first two lines of the Table 3 for quartz glass and for carbon disulphide. In the columns 2 and 3 of the Table 3 are given the respective Verdet's constants $\omega$ for the respective combinations of quartz glass and carbon disulphide. From these values is formed in the fourth column the ratio and in the fifth column is given the respective ratio of the specific rotations $\alpha$ of a few optically active measuring substances.

*Table 3*

| Quartz glass | | | $\omega_{436}$=0.02602 | $\omega_{546}$=0.01671 |
|---|---|---|---|---|
| Carbon disulphide | | | $\omega_{436}$=0.08720 | $\omega_{546}$=0.05130 |

| p | $\omega_{436}$ | $\omega_{546}$ | $\omega_{436}/\omega_{546}$ | $|\alpha|_{436}/|\alpha|_{546}$ |
|---|---|---|---|---|
| 0 | 0.02602 | 0.01671 | 1.557 | |
| 0.1 | 0.03474 | 0.02184 | 1.591 | |
| 0.2 | 0.04346 | 0.02697 | 1.611 | 1.616 glucose in H$_2$O. |
| 0.3 | 0.05218 | 0.03210 | 1.626 | 1.627 quartz. |
| 0.4 | 0.06090 | 0.03723 | 1.636 | |
| 0.5 | 0.06962 | 0.04236 | 1.644 | 1.644 sucrose in H$_2$O. |
| 0.6 | 0.07834 | 0.04749 | 1.650 | 1.650 1-menthol. |
| 0.7 | 0.08706 | 0.05262 | 1.654 | |

The Table 3 indicates that the compensation Faraday coil shown in FIG. 2 may be adjusted in such a manner by a simple slidable movement of the quartz glass rod 19 that it may be used for different objects to be measured. The variation range is relatively large.

Figure 3:
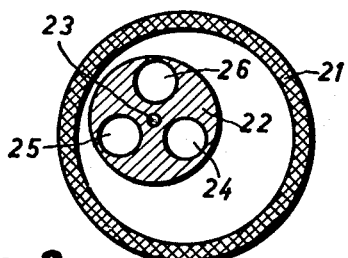
FIG. 3 is a cross sectional view of a changer device arranged within a compensation Faraday coil.

FIG. 3 illustrates a compensation Faraday coil having a winding 21 which has such a size that within the same a turret 22 may be arranged which is rotatable about an axis 23 extending spaced and parallel to the axis of the winding 21. The turret 22 is provided with three parallel cylindrical bores 24, 25 and 26, in each one of which a different magneto-optical active substance may be placed.

If, by way of example, the bore 24 is filled with an acetone-water mixture as indicated in Table 1, while the bore 25 is filled with water, then the position of the turret 22 as shown in FIG. 3 permits the compensation Faraday coil to measure sucrose. A simple rotation of the turret 22 about its axis 23 removes the bore 24 from the path of the light rays while the bore 25 is moved into the path of the light rays so that now the compensation Faraday coil may be used for measuring glucose.

What we claim is:

1. In a photoelectric polarimeter, a source of light to direct rays along a light path, a stationary polarizer and a stationary analyzer arranged in spaced relation within said light path to provide a space for receiving an object to be measured, a modulating Faraday coil in said light path energized by a alternating current and serving to rotate the plane of polarization of said light after passing through said polarizer, a compensating Faraday coil arranged in the direction of the light and in front of said analyzer, a photoelectric receiver within said light path arranged so that the light passing through said analyzer impinges thereon, an amplifier electrically connected to said photoelectric receiver, a current rectifier electrically connected to said amplifier for providing a direct current means for supplying said direct current to said compensating Faraday coil in order to compensate the rotation of the plane of polarization in the object to be measured, said source of light furnishing light within a predetermined wave length range, said compensating Faraday coil containing at least two magneto-optically active substances, which have different Verdet constants, arranged one behind the other in the direction of the light, and means for adjusting the path length through at least one of said substances to produce a conformal dispersion of the Verdet constant of said compensating cell with the specific rotation of the object to be measured within the wave length range of the source of light.

2. In a photoelectric polarimeter according to claim 1 wherein said compensating Faraday coil contains a tube filled with a liquid, one end of said tube being in communication with liquid collecting container, a glass rod arranged longitudinally slidable and extending into the other end of said tube, and means for moving said glass rod into said tube to vary the path length through said liquid in order to produce a conformal dispersion of the Verdet constant of said compensating cell with the specific rotation of the object to be measured within the wave length of the source of light.

3. A photoelectric polarimeter according to claim 1 in which said source of measuring light comprises a polychromatic source of light and filters through which the light passes before reaching the compensating Faraday cell.

4. In a photoelectric polarimeter, a source of light to direct rays along a light path, a stationary polarizer and a stationary analyzer arranged in spaced relation within said light path to provide a space for receiving an object to be measured, a modulating Faraday coil in said light path energized by an alternating current and serving to rotate the plane of polarization of said light after passing through said polarizer, a compensating Faraday coil arranged in the direction of the light and in front of said analyzer, a photoelectric receiver within said light path arranged so that the light passing through said analyzer impinges thereon, an amplifier electrically connected to said photoelectric receiver, a current rectifier electrically connected to said amplifier for providing a direct current, means for supplying said direct current to said compensating Faraday coil in order to compensate the rotation of the plane of polarization in the object to be measured, said source of light furnishing light within a predeterminde wave length range, said compensating Faraday coil containing at least two magneto-optically active substances, which have different Verdet constants, arranged one behind the other in the direction of the light, the Verdet constants of said two substances cooperating proportionally according to the effective path length through each substance so that a conformal dispersion of the Verdet constant of the compensating coil with the specific rotation of the object to be measured results within the wave length range of the source of light.

References Cited by the Examiner

UNITED STATES PATENTS 2,933,972   4/60   Wenking _____ 88—14

OTHER REFERENCES

Walker: Measurement of Faraday Effect and Colton-Monton Effect Using Transient Magnetic Fields and Photo-Multiplier-Type Compensators, Journal the Optical Society of America, vol. 40, No. 11, pages 766–768, November 1950.

JEWELL H. PEDERSEN, *Primary Examiner.*

EMIL G. ANDERSON, *Examiner.*